United States Patent [19]

Fenton

[11] 4,104,430
[45] Aug. 1, 1978

[54] VACUUM FORMABLE MATERIALS

[75] Inventor: Sidney Desmond Fenton, Lancashire, England

[73] Assignee: Storey Brothers and Company Limited, Lancaster, England

[21] Appl. No.: 583,126

[22] Filed: Jun. 2, 1975

[51] Int. Cl.² .......................... B32B 5/02; B32B 5/18
[52] U.S. Cl. .................... 428/175; 264/46.8;
264/92; 428/215; 428/246; 428/252; 428/253;
428/286; 428/314; 428/315; 428/311; 428/320;
428/425; 428/474; 428/518; 428/520; 428/522
[58] Field of Search ............. 428/215, 516, 520, 315,
428/311, 175, 190, 246, 252, 253, 286, 314, 425,
522, 320, 474, 518; 264/92, 46.8

[56] References Cited
U.S. PATENT DOCUMENTS

| | | | |
|---|---|---|---|
| 2,792,322 | 5/1957 | Fredericks | 428/520 |
| 3,075,863 | 1/1963 | Frey | 428/520 |
| 3,336,180 | 8/1967 | Werner | 428/520 |
| 3,399,107 | 8/1968 | Biskup | 428/315 |
| 3,433,700 | 3/1969 | Migdol | 428/315 |
| 3,535,196 | 10/1970 | Laberinti | 428/522 |
| 3,576,703 | 4/1971 | Baker | 428/520 |
| 3,671,375 | 6/1972 | Van Buskirk | 428/315 |
| 3,729,370 | 4/1973 | Cobbledick | 428/522 |
| 3,933,548 | 1/1976 | Anderson | 428/315 |

FOREIGN PATENT DOCUMENTS

| | | |
|---|---|---|
| 1,188,573 | 4/1970 | United Kingdom. |
| 1,261,682 | 1/1972 | United Kingdom. |
| 923,207 | 4/1963 | United Kingdom. |
| 1,032,868 | 6/1966 | United Kingdom. |
| 1,036,539 | 7/1966 | United Kingdom. |

*Primary Examiner*—Ellis Robinson
*Attorney, Agent, or Firm*—Pollock, Vande Sande & Priddy

[57] ABSTRACT

The preparation of a laminate which can be shaped by vacuum forming is described. The laminate is of a stretchable fabric, a plasticized vinyl chloride polymer layer and sandwiched between them a plastics foam layer. Such a material has a luxurious and "full" feel even after shaping.

9 Claims, 1 Drawing Figure

U.S. Patent     Aug. 1, 1978     4,104,430
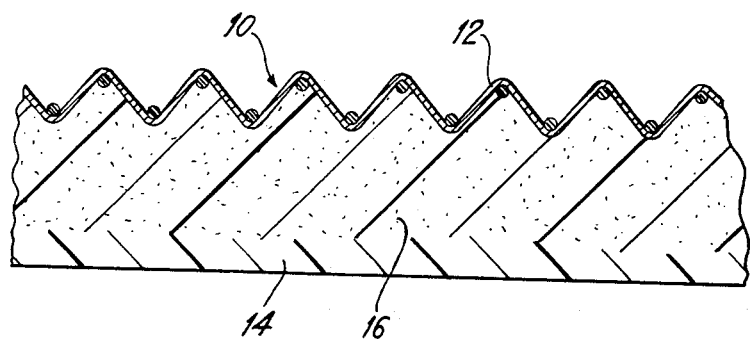

VACUUM FORMABLE MATERIALS

This invention relates to a vacuum formable material.

According to the invention there is provided a vacuum formable material comprising a laminate of a stretchable fabric, a plasticized vinyl chloride polymer layer and sandwiched between them a plastics foam layer.

This material can be vacuum formed to shape to give a shaped material which has a luxurious and 'full' feel.

The stretchability of the fabric will be chosen in dependance upon this extent to which the material is to be drawn during vacuum forming. Thus for materials which do not need to be deeply drawn, e.g. in the formation of a panel for the top of a seat cover, a ready stretchability of at least about 5% in at least one direction, and preferably in two directions at right angles to one another, under a 5 lb load for a 2 inch wide strip is usually sufficient; such a fabric can be a knitted fabric such as a knitted nylon fabric of 30 denier yarn having 61 courses and 42 wales per inch and weighing 2.4 oz/sq. yard or a knitted nylon fabric having 68 stitches per inch and 81 rows per inch and weighing 5.5. oz/square yard. For materials which are to be deeply drawn, e.g. in the formation of a one piece cover for a seat, an extensibility of, at least 20% and preferably 25% in at least one direction and preferably in two directions at right angles to one another, for a 2 inch wide strip under a load of 5 lb is desirable; such a fabric can be obtained by forming the fabric from yarns, filaments or the like which are readily extensible because they are highly crimped or coiled, e.g. highly crimped nylon 6 yarns or coiled yarns or by forming the fabric in such a way as to have high extensibility, e.g. by twill or sateen weaving or by using non-woven fabrics. Naturally fabrics having extensibilities or stretchabilities between these limits can be used depending upon the extent to which the material is drawn.

The plasticized vinyl chloride polymer is preferably polyvinyl chloride but could be a copolymer of vinyl chloride. This can be a cast film or calandered sheet and is preferably from 0.1 to 2 mm in thickness. It is preferably a cast film, however, since the resulting sheet can then contain a much higher proportion of plasticizer than a calandered sheet and so be much softer and more pliable.

The foam layer sandwiched between the fabric and the vinyl chloride polymer layer is preferably a polyurethane (polyether or polyester urethane) or a vinyl chloride polymer. The foam can be a closed cell foam but is preferably an open-celled foam. In the case of the latter type of foam the material has the advantage that the fabric layer and foam are porous or breathable and so when the material of the invention is used as a cover for upholstered items this can provide increased comfort.

The foam layer can for example be from 1 to 20 mm thick. The thicker the layer the more luxurious the "feel" of the resulting shaped material but on the other hand the thicker this foam layer becomes, the less possible it is to incorporate finely detailed shaping into a shaped cover formed by vacuum forming the material of the invention.

The vacuum forming of a sheet material by heating it to soften it and then drawing it down into a female mould or over a male mould is well known and needs no further explanation. The equivalent excess fluid pressure process in which an excess fluid pressure is used to force the softened sheet material into or over a mould is to be considered herein to be embraced by the term "vacuum forming".

The materials of the invention can be prepared in a number of ways by laminating the components. According to preferred ways of making the materials, the foam layer is formed, e.g. by foaming a layer of foamable material or by slicing a veneer of foam from a mass of foams, the fabric can then be adhered to one side of the foam layer, e.g. by using an adhesive or by flame softening the surface of the foam to make it sticky and finally a cast or calandered vinyl chloride polymer sheet can be adhered to the other surface of the foam layer, e.g. by an adhesive or by laminating to the foam and fabric laminate while the vinyl chloride polymer sheet is still hot and sticky after being gelled.

The vacuum formable material is particularly useful in the preparation of covers for upholstered and padded items such as car seats and in this connection it can be used in the preparation of such items in the manners described in our copending patent application Nos. 36525/71, 36526/71, 6544/72, 4929/73 and 4930/73. The material of the invention will normally be used with the fabric side of the laminate outermost.

A vacuum formable material according to the invention is shown, by way of example, in cross-section in the accompanying FIGURE. The material 10 is a laminate of an outer fabric layer 12 and an outer cast plasticized polyvinyl chloride sheet 14 between which is a plastics foam layer 16.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What I claim is:

1. A vacuum formed laminate from a material comprising:
   a. a stretchable fabric having a ready stretchability of at least 20% in at least about one direction under a 5 lb load for a 2 inch wide strip,
   b. a cast plasticized vinyl chloride polymer layer which is 0.1 to 2 mm thick, and
   c. sandwiched between said fabric and said layer, a plastic foam layer which is from 1 to 20 mm thick.

2. A material according to claim 1 in which said vinyl chloride polymer is polyvinyl chloride.

3. A material as claimed in claim 1 in which said foam is an open-celled foam.

4. A material as claimed in claim 1 in which said plastics foam has been chosen from a polyurethane foam and a vinyl chloride polymer foam.

5. The material of claim 1 wherein said stretchable fabric has a ready stretchability of at least about 5% in two directions at right angles to each other under a 5 lb. load for a two inch wide strip.

6. The material of claim 5 wherein said stretchable fabric is a knitted nylon fabric.

7. The material of claim 1 wherein said stretchable fabric has a ready stretchability of at least 25% in two directions at right angles to one another for a two inch wide strip under a load of 5 lbs.

8. The material of claim 7 wherein said stretchable fabric is a highly crimped nylon yarn.

9. A material of claim 1 wherein said foam is an open-celled foam and is selected from the group consisting of polyurethane foam and vinyl chloride polymer foam.

* * * * *